(12) United States Patent
Krauthamer et al.

(10) Patent No.: US 11,215,915 B2
(45) Date of Patent: Jan. 4, 2022

(54) ENHANCED GRANULAR MATERIAL EFFECTS

(71) Applicant: Universal City Studios LLC, Universal City, CA (US)

(72) Inventors: Akiva Meir Krauthamer, Orlando, FL (US); Timothy Fitzgerald Garnier, Orlando, FL (US); Matthew Usi, Pasadena, CA (US); Elam Kevin Hertzler, Orlando, FL (US); Simran Veena Batra, Davenport, FL (US); Aaron Chandler Jeromin, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 213 days.

(21) Appl. No.: 16/685,384

(22) Filed: Nov. 15, 2019

(65) Prior Publication Data
US 2021/0033957 A1    Feb. 4, 2021

Related U.S. Application Data

(60) Provisional application No. 62/879,892, filed on Jul. 29, 2019.

(51) Int. Cl.
| | |
|---|---|
| *G03B 21/608* | (2014.01) |
| *A63G 31/00* | (2006.01) |
| *G03B 21/60* | (2014.01) |
| *B65D 83/28* | (2006.01) |
| *G03B 17/54* | (2021.01) |
| *G03B 21/14* | (2006.01) |

(52) U.S. Cl.
CPC ............ *G03B 21/60* (2013.01); *B65D 83/28* (2013.01); *G03B 17/54* (2013.01); *G03B 21/14* (2013.01)

(58) Field of Classification Search
CPC combination set(s) only.
See application file for complete search history.

(56) References Cited

U.S. PATENT DOCUMENTS

| | | |
|---|---|---|
| 3,108,022 A | 10/1963 | Church |
| 3,563,460 A | 2/1971 | Nine |
| 7,243,857 B2 | 7/2007 | Kallestad |
| 7,405,654 B2 | 7/2008 | Staffin |
| 8,388,139 B2 | 3/2013 | LaDuke |
| 9,855,470 B1 | 1/2018 | Cassidy |
| 2015/0047126 A1 | 2/2015 | Klink et al. |
| 2017/0189825 A1 | 7/2017 | Lee |

OTHER PUBLICATIONS

PCT/US2020/043819 Invitation to Pay Additional Fees Oct. 21, 2020.
Aerial Image on Retroreflective Particles, https://youtu.be/sLHKTFW9i90, Nov. 26, 2017.
Liquid Sand Hot Tub—Fluidized airbed, https://www.youtube.com/watch?v=My4RA5I0FKs&feature=youtu.be, Nov. 28, 2017.

*Primary Examiner* — Ryan D Howard
(74) *Attorney, Agent, or Firm* — Fletcher Yoder, P.C.

(57) ABSTRACT

A granular material effect system includes a plurality of granular particles disposed in a container, a nozzle configured to activate to direct a fluid into the container, an actuator coupled to a prop and disposed in the container within the plurality of granular particles, and a controller communicatively coupled to the nozzle and the actuator. The controller is configured to instruct the nozzle to activate to direct the fluid into the container and to instruct the actuator to move the prop relative to the container while the nozzle is activated.

20 Claims, 11 Drawing Sheets

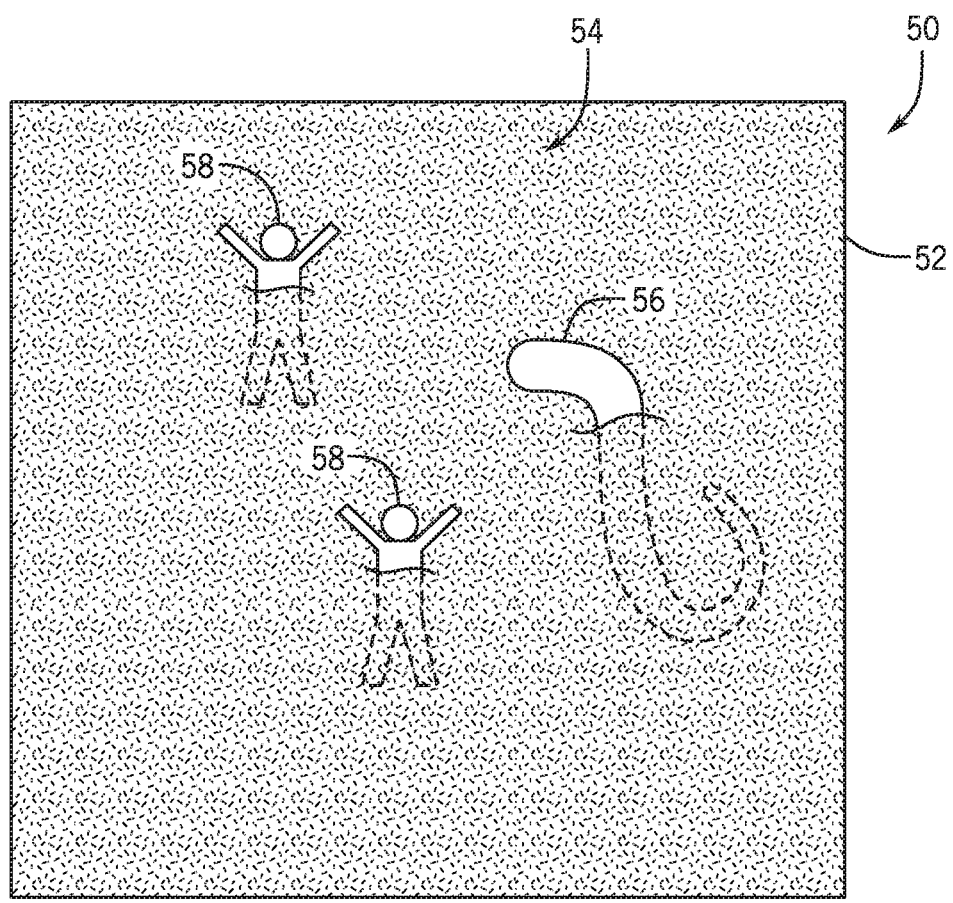
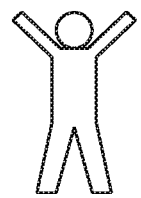
FIG. 1

ENHANCED GRANULAR MATERIAL EFFECTS

CROSS REFERENCE TO RELATED APPLICATIONS

This application claims priority from and the benefit of U.S. Provisional Application No. 62/879,892, entitled "ENHANCED GRANULAR MATERIAL EFFECTS," filed Jul. 29, 2019, and is herein incorporated by reference in its entirety for all purposes.

BACKGROUND

This disclosure relates generally to systems and methods for generating programmable three-dimensional special effects and, specifically, techniques for generating special effects using granular particles.

This section is intended to introduce the reader to various aspects of art that may be related to various aspects of the present disclosure. This discussion is believed to be helpful in providing the reader with background information to facilitate a better understanding of the various aspects of the present disclosure. Accordingly, it should be noted that these statements are to be read in this light and not as admissions of prior art.

Throughout amusement parks and other entertainment venues, special effects can be used to help immerse guests in the experience of a ride or attraction. Immersive environments may include three-dimensional (3D) props and set pieces, robotic or mechanical elements, and/or display surfaces that present media. In addition, the immersive environment may include audio effects, smoke effects, and/or motion effects. Thus, immersive environments may include a combination of dynamic and static elements. However, installation of an immersive environment is complex, and certain elements of the immersive environment are difficult to update or change to incorporate new narratives. With the increasing sophistication and complexity of modern ride attractions, and the corresponding increase in expectations among theme or amusement park patrons, improved and more creative attractions are desirable, including ride attractions having more complex immersive environments.

BRIEF DESCRIPTION

A summary of certain embodiments disclosed herein is set forth below. It should be noted that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a granular material effect system includes a plurality of granular particles disposed in a container, a nozzle configured to activate to direct a fluid into the container, an actuator coupled to a prop and disposed in the container within the plurality of granular particles, and a controller communicatively coupled to the nozzle and the actuator. The controller is configured to instruct the nozzle to activate to direct the fluid into the container and to instruct the actuator to move the prop relative to the container while the nozzle is activated.

In an embodiment, a granular material effect system includes a plurality of granular particles disposed in a container and a plurality of nozzles disposed about the container, in which each nozzle of the plurality of nozzles is configured to activate to inject fluid into the container to move at least a portion of the granular particles of the plurality of granular particles. The granular material effect system further includes a prop disposed in the container and a controller communicatively coupled to each nozzle of the plurality of nozzles. The controller is configured to receive feedback indicative of a target position of the prop and an actual position of the prop and instruct a subset of nozzles of the plurality of nozzles to activate in response to receiving the feedback, in which activation of the plurality of nozzles causes injection of fluid into the container to move the prop from the actual position towards the target position.

In an embodiment, a granular material effect system includes a plurality of granular particles disposed in a container, a plurality of nozzles, in which each nozzle of the plurality of nozzles is configured to inject fluid into the container, one or more position sensors, and a controller communicatively coupled to each nozzle of the plurality of nozzles. The controller is configured to receive feedback from the one or more position sensors indicative of a position of a user in or near the container and instruct at least one nozzle of the plurality of nozzles to inject fluid into the container based on the feedback to fluidize the granular particles.

DRAWINGS

These and other features, aspects, and advantages of the present disclosure will become better noted when the following detailed description is read with reference to the accompanying drawings in which like characters represent like parts throughout the drawings, wherein:

FIG. 1 is a schematic view of an embodiment of a granular material effect system having a container in which a plurality of granular particles may be disposed, in accordance with an aspect of the present disclosure;

Figure 10:
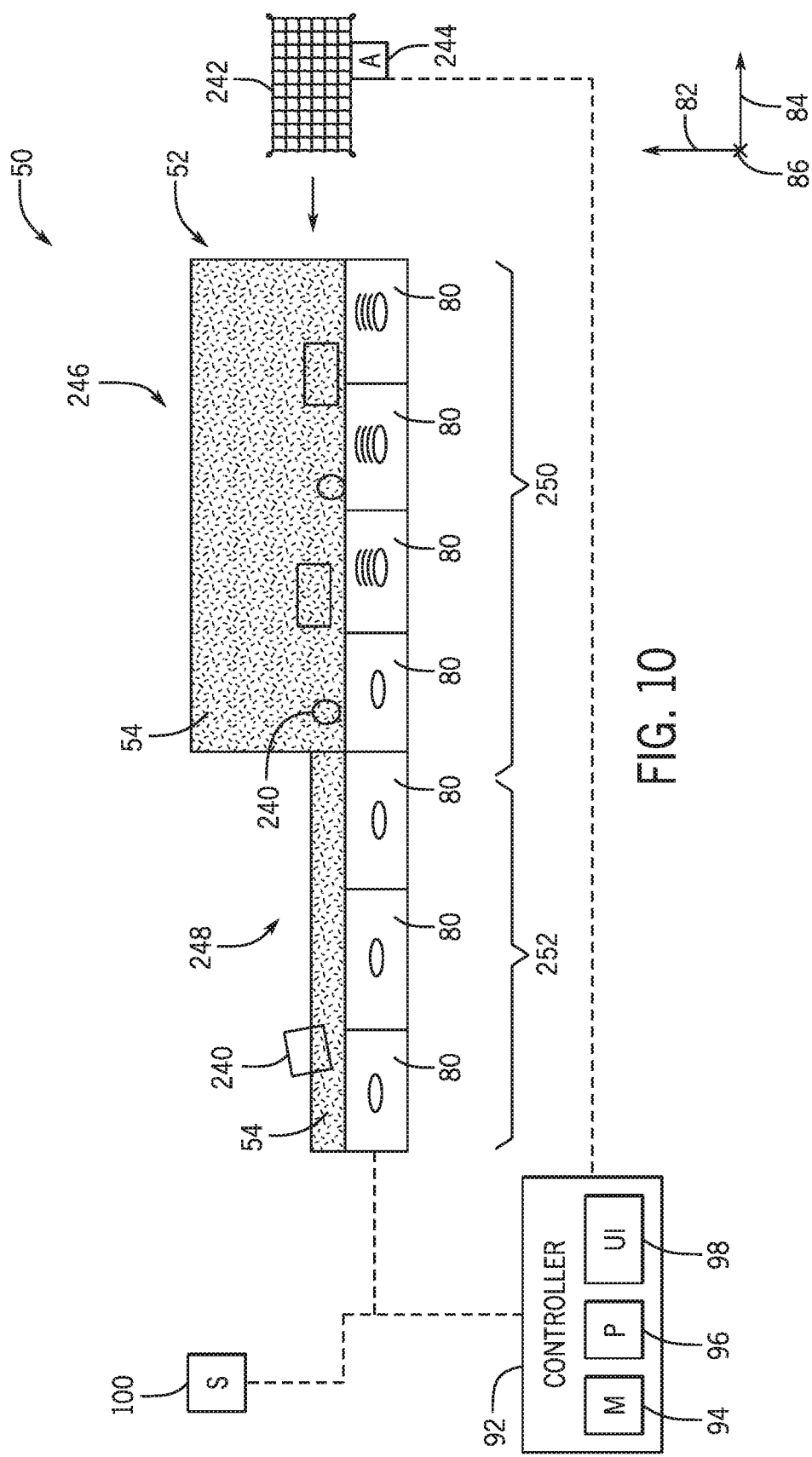
Figure 11:
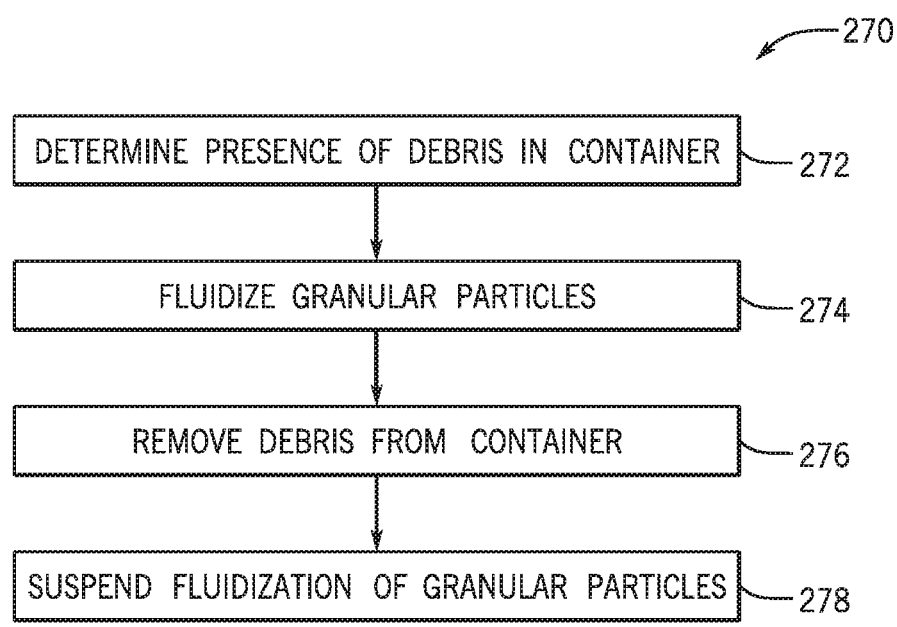

FIG. 10 is a schematic side view of an embodiment of the granular material effect system that is configured to facilitate removal of debris that may be disposed within the granular particles, in accordance with an aspect of the present disclosure; and FIG. 11 is a flowchart of a method or process that may be employed by the granular material effect system of FIG. 10 to remove debris within the container, in accordance with an aspect of the present disclosure.

DETAILED DESCRIPTION

One or more specific embodiments will be described below. In an effort to provide a concise description of these embodiments, not all features of an actual implementation are described in the specification. It should be noted that in the development of any such actual implementation, as in any engineering or design project, numerous implementation-specific decisions must be made to achieve the developers' specific goals, such as compliance with system-related and business-related constraints, which may vary from one implementation to another. Moreover, it should be noted that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. One or more specific embodiments of the present embodiments described herein will be described below. In an effort to provide a concise description of these embodiments, all features of an actual implementation may not be described in the specification. It should be noted that in the development of any such actual implementation, as in any engineering or design project, numerous implementation-specific decisions must be made to achieve the developers' specific goals, such as compliance with system-related and business-related constraints, which may vary from one implementation to another. Moreover, it should be noted that such a development effort might be complex and time consuming, but would nevertheless be a routine undertaking of design, fabrication, and manufacture for those of ordinary skill having the benefit of this disclosure.

The present disclosure relates to systems and methods that utilize shaped granular material, such as sand, to form three-dimensional (3D) effects that are programmable and dynamic. In an embodiment, the disclosed shaped granular material effects are provided within an entertainment venue, such as an amusement or theme park. Accordingly, the shaped granular material effects may be used to create 3D objects (surfaces, prop elements, texture, etc.) within an attraction. Further, the shaped granular material effects may move or shift as part of the overall immersive environment, creating more complex environmental cues to help immerse a guest.

While granular material may be used as an inert part of landscaping (e.g., sand on a beach) the present disclosure is directed to techniques for dynamic activation of granular material to create shapes, textures, and objects using granular material. In an embodiment, the granular material may ripple or flow to enhance the cues for wind effects, may suddenly reveal a hidden object, and/or may create complex shapes and textures that are enhanced by additional effects, such as projection mapping. For example, the granular material may be used for a show effect, such as to provide dynamic scenery or a surrounding. In addition, the granular material may create a base within which other objects are moved to add complexity to the immersive environment.

Embodiments of the present disclosure are directed to a system that may facilitate movement of objects through granular material. The granular material may be formed from granular particles. As used herein, granular particles may include any suitably sized particle, such as sand, sugar, salt, metal powder, polystyrene, foam, acrylic beads, sawdust, glass, another suitable particle, or any combination thereof. In an embodiment, the granular particles may include color-changing materials (e.g., that change color based on temperature) or materials that glow under fluorescent light. The granular particles may include particles of different types (sizes, materials) or may be homogenous (e.g., of a same type). The objects and the granular particles may be used as a show effect in an attraction of an amusement park, such as to display an animated presentation, in which the objects may be moved relative to the granular particles.

However, moving the objects through the granular particles may be difficult. The granular particles may be dense and, therefore, may restrict movement of the objects when the objects are submerged in the granular particles. Thus, a degree of motion of certain objects may be limited, thereby limiting a visual effect provided by the system. Alternatively, an excessive force may be used to effectively move the objects through the granular particles. In this manner, increased energy associated with providing the excessive force may be consumed.

Thus, facilitating movement of the object through the granular particles may enhance the system in providing a visual effect. In accordance with embodiments of the present disclosure, the system may inject fluid through the granular particles. In one embodiment, the system injects the fluid through the granular particulate such that at least a portion of the individual granular particles are suspended within the fluid, rather than stacked atop one another. As such, the granular particles may be more easily displaced to enable an object to move through the granular particles. In addition to enabling objects to move more easily through the granular particles, the system may inject fluid through the granular particles to achieve other effects that may enhance the presentation provided by the system, such as to enhance a user interaction with the granular particles.

Turning now to the drawings, FIG. 1 is a schematic view of an embodiment of a granular material effect system 50 having a container 52 in which a plurality of granular particles 54 may be disposed. As used herein, the container 52 may include any component, such as an enclosure, a tub, a tank, a pit, a reservoir, or any other suitable object that holds the granular particles 54 in a defined area during fluidization of the granular particles 54. The granular material effect system 50 may be implemented in an entertainment setting, such as for an attraction of an amusement park, for a prop of a show or performance, and so forth, and the granular particles 54 may be used to produce a desired effect. The granular material effect system 50 may inject fluid through (e.g., fluidize), the granular particles 54 to move the granular particles 54 within the container 52. In this manner, the granular particles 54 may be more easily moved within the container 52 and/or shaped to produce a visual effect. For example, the granular particles 54 may appear to have liquid properties and characteristics, such as wave-like movement.

In an embodiment, the granular material effect system 50 may include one or more props 56. The prop 56 may be controlled in conjunction with the injection of fluid through the granular particles 54. For example, the prop 56 may emerge out of, submerge into, and/or move through the granular particles 54. Such movement of the prop 56 relative to the granular particles 54 may enhance the effect of the prop 56. In an additional or an alternative embodiment, users 58 (e.g., amusement park guests, show performers) may interact with the granular particles 54. For example, the users 58 may move within the container 52 and position themselves within the granular particles 54. In this manner, the granular material effect system 50 may be similar to a sandbox and/or a ball pit in which the users 58 may move within the granular particles 54.

Figure 2:
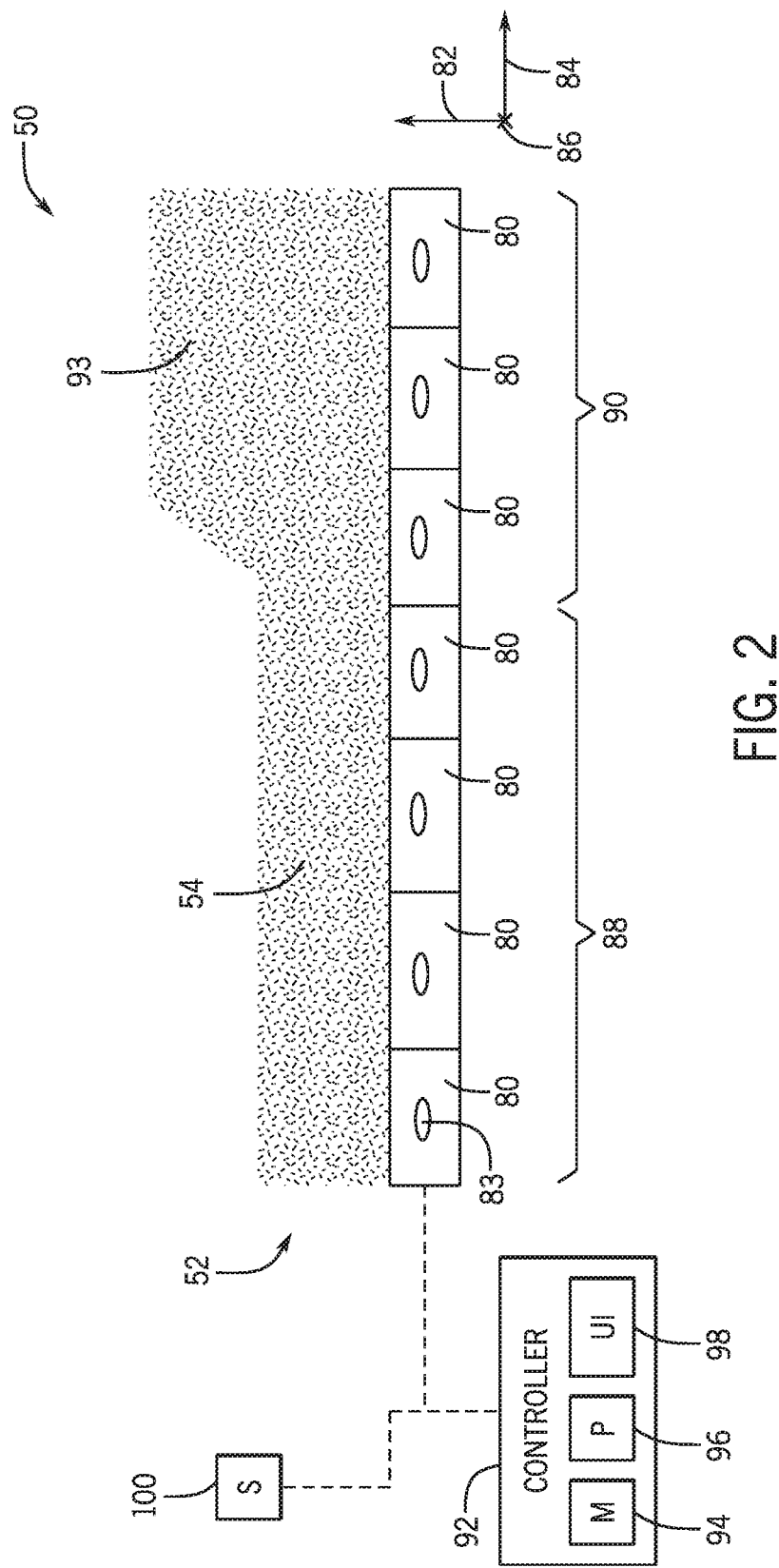
FIG. 2 is a schematic side view of an embodiment of the granular material effect system having an array of nozzles that are configured to be activated to inject a fluid into a container of granular particles, in accordance with an aspect of the present disclosure.

FIG. 2 is a schematic side view of an embodiment of the granular material effect system 50 having an array of individually addressable nozzles 80 that are configured to activate to inject fluid into the container 52 holding the granular particles 54. As used herein, the nozzles 80 may include any suitable device that may emit a fluid through the granular particles 54, such as a fan, a blowers, a sprayer, and/or another suitable component. Each nozzle 80 of the array of nozzles 80 may be disposed about a different location of the container 52, and may force or draw a fluid (e.g., ambient air, water, gaseous mixture) through the container 52, thereby fluidizing or aerating the granular particles 54 to suspend or move the granular particles 54 in the container 52. In the illustrated embodiment, each nozzle 80 may direct the fluid orthogonally to a plane created by a longitudinal axis 84 and a lateral axis 86. The fluid emitted by each nozzle 80 is defined by a shape and an orientation of the fluid outlet 83 of each nozzle and a position within the container 52, such that the granular particles 54 at the particular area are generally directed orthogonally to the plane created by the axes 84, 86. Additionally or alternatively, the nozzles 80 may direct the fluid in other orientations relative to the plane created by the axes 84, 86, such as parallel to the plane created by the axes 84, 86. In an embodiment, one or more of the nozzles 80 may be actuatable and capable of changing an orientation of the fluid outlet 83 with respect to the container 52 under instructions from the controller 92 to further direct the fluid along a desired axis.

Moreover, the nozzles 80 may be controlled independently from one another, and may each direct a fluid through the container 52 at controlled flowrates. For instance, a first set 88 of nozzles 80 may direct the fluid through the container 52 at a first flowrate and a second set 90 of nozzles 80 may direct the fluid through the container 52 at a second flowrate, in which the second flowrate is different than (e.g., greater than) the first flowrate. In this manner, the second set of nozzles 80 may force the granular particles 54 to a different (e.g., higher) height an axis parallel to the vertical axis 82 as compared to a height from the plane created by the axes 84, 86 to which the first set of nozzles 80 may force the granular particles. As a result, controlling the nozzles 80 to direct the fluid through the container 52 at different flowrates may generally move the granular particles 54 to different positions within the container 52 to form shaped protrusions 93. By way of example, the nozzles 80 may be controlled to cause certain manners of movement (e.g., vertical jet) of the granular particles 54 at different locations of the container 52, and such movement of granular particles 54 may be coordinated (e.g., with backing music).

In the illustrated embodiment, the container 52 includes boundaries that generally align with axes parallel to the axis 82, the longitudinal axis 84, and/or the lateral axis 86, respectively. However, in an additional or an alternative embodiment, the container 52 may include boundaries that are not orthogonal to axes parallel to the axis 82, the longitudinal axis 84, and/or the lateral axis 86, such as slopes. Such geometries of the container 52 may cause movement and/or positioning of the granular particles 54 (e.g., sliding along the boundaries) without activation of the nozzles 80. In a further embodiment, the container 52 may also move (e.g., tilt) to cause movement of the granular particles 54 within the container 52. In any case, the nozzles 80 may also be activated while the granular particles 54 are moving within the container 52, thereby causing further movement and/or positioning of the granular particles 54.

The granular material effect system 50 may include or be communicatively coupled to a controller 92. The controller 92 may have a memory 94 and a processor 96. The memory 94 may include volatile memory, such as random access memory (RAM), and/or non-volatile memory, such as read-only memory (ROM), optical drives, hard disc drives, solid-state drives, or any other non-transitory computer-readable medium that includes instructions to operate the granular material effect system 50. The processor 96 may be configured to execute such instructions. For example, the processor 96 may include one or more application specific integrated circuits (ASICs), one or more field programmable gate arrays (FPGAs), one or more general purpose processors, or any combination thereof. The controller 92 may also include a user interface 98 such as a touch screen, a trackpad, a button, a switch, another suitable component, or any combination thereof, with which a user may interact to operate the granular material effect system 50. The controller 92 may receive a user input as a result of the interaction between the user and the user interface 98 and may output a signal to operate the granular material effect system 50 based on the interaction.

In the illustrated embodiment, the controller 92 is configured to control each of the individual nozzles 80 independently, such as to activate and deactivate the individual nozzles 80 according to desired timing and/or to control a flowrate of the fluid directed by each individual nozzle 80. As an example, a user (e.g., one of the users 58) may utilize the user interface 98 to change or set an operation of one of the nozzles 80 to direct the fluid through the container 52. Additionally or alternatively, the controller 92 may control each of the individual nozzles 80 based on an operating parameter of the granular material effect system 50 as indicated by a sensor 100 communicatively coupled to the controller 92. That is, the sensor 100 may transmit feedback indicative of the operating parameter to the controller 92, and the controller 92 may change or set the operation of the individual nozzles 80 based on the feedback. For example, the operating parameter may include a time that the granular material effect system 50 is in operation, a profile of the granular particles 54, a position of props 56 and/or users 58 within the granular material effect system 50, or any combination thereof.

Figure 3:
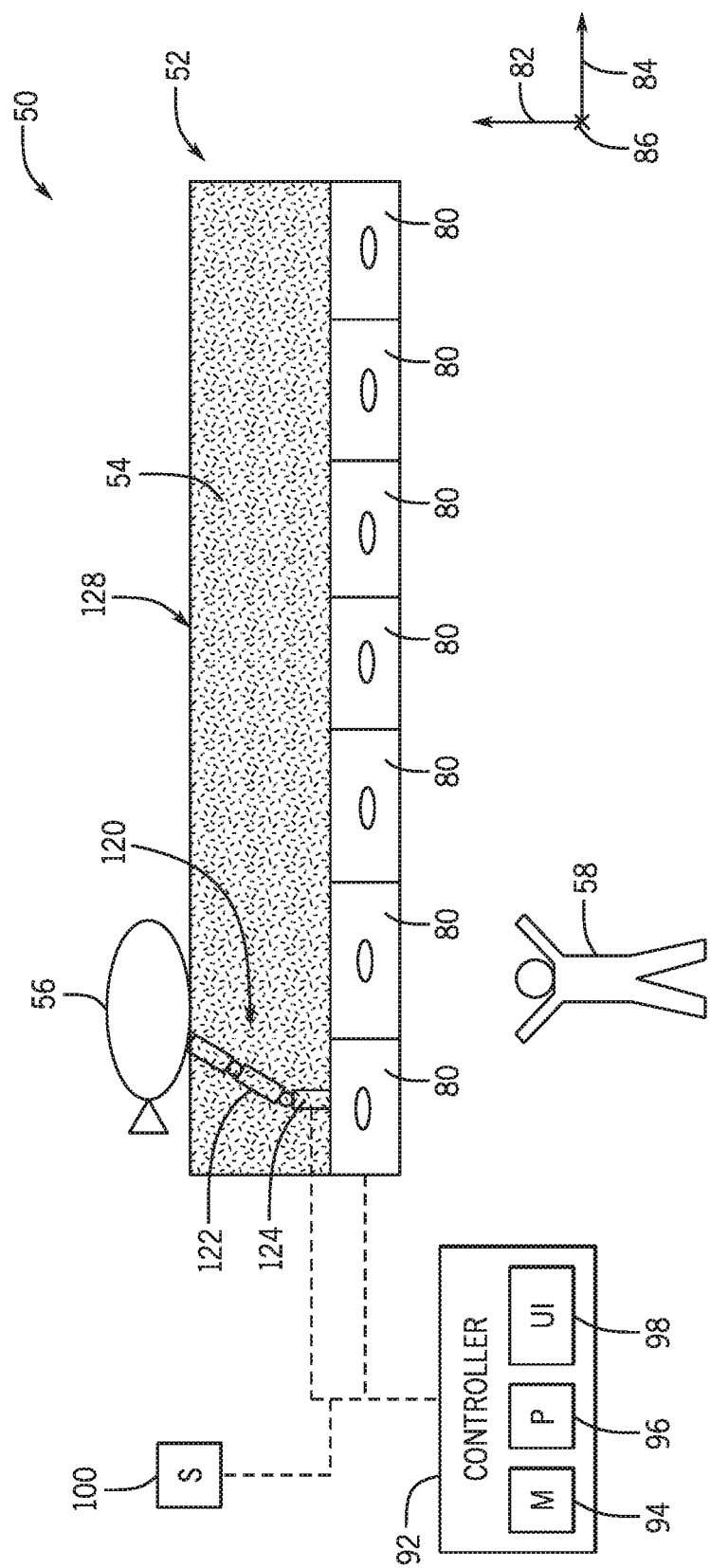
FIG. 3 is a schematic side view of an embodiment of the granular material effect system in conjunction with a prop configured to move within the container and through the granular particles, in accordance with an aspect of the present disclosure.

FIG. 3 is a schematic side view of an embodiment of the granular material effect system 50 having the nozzles 80 configured to inject fluid through the granular particles 54 and having the prop 56 configured to move within the container 52. Movement of the prop 56 relative to the granular particles 54 may produce an effect that enhances the appearance of the prop 56. For example, fluid injection through the granular particles 54 may result in a liquid like appearance and characteristics (fluidization) of the granular particles 54, and the prop 56 may move through the granular particles 54 as if the prop 56 is traveling through (e.g., swimming across) a body of water. In an example implementation, the prop 56 may be made at least in part from a mesh or bored material to enable the fluid to be directed through the prop 56. As such, the prop 56 does not block the fluid directed through the container 52 of the granular particles 54 by the nozzles 80 and enables the array of nozzles 80 to inject fluid through the granular particles 54 effectively.

The prop 56 may be coupled to a prop actuator 120, which may be a hydraulic actuator, a pneumatic actuator, an electromechanical actuator, another suitable actuator, or any combination thereof, and may be communicatively coupled to the controller 92. The prop actuator 120 may include multiple segments 122 that are movably coupled to one another. The controller 92 may coordinate the segments 122 to move (e.g., rotate) relative to one another in order to move the prop 56 within the container 52, such as parallel to vertical axis 82, the longitudinal axis 84, and/or the lateral axis 86. In one implementation, the prop actuator 120 may have a base segment 124 that is coupled to the container 52 and remains stationary with respect to the container 52. That is, the base segment 124 is coupled to a single section of the container 52, and the other segments 122 may move relative to the base segment 124 and to one another. Additionally or alternatively, the base segment 124 may be movably coupled to the container 52. For instance, the base segment 124 may be configured to move linearly (e.g., slide) across the container 52 to move the prop 56. In one embodiment, the controller 92 may instruct the prop actuator 120 to move the prop 56 while remaining submerged within the granular particles 54, such that the prop actuator 120 is not visible. As an example, the sensor 100 may be configured to determine a position of the prop actuator 120 with respect to the granular particles 54. Based on the determined position of the prop actuator 120, the controller 92 may instruct the prop actuator 120 to move in a manner that keeps the prop actuator 120 covered by the granular particles 54. Thus, the prop 56 may appear to be moving without the use of the prop actuator 120, further enhancing the effect of the prop 56 in motion. The base segment 124 may include a platform that moves a previously submerged prop 56 toward a surface 128 of the granular particles 54. In this manner, a hidden object (e.g., a "lost" object) may be revealed based on desired triggers. The movement of the prop 56, as disclosed, may be synchronized with fluid injection into the granular particles 54 to permit ease of prop actuation through the granular particles 54 to enhance the effect. Further, retraction of the prop 56 into the submerged position may also be synchronized with fluid injection for ease of retraction.

In an embodiment, the granular material effect system 50 may be used as a show effect, such as to present an animation that users 58 may watch. For instance, the granular material effect system 50 may be used in a ride system and may display an animation as the users 58 pass by the granular material effect system 50. In an additional or an alternative embodiment, the users 58 may be able to control a certain extent of the movement of the prop 56. For example, the prop 56 may be a user-associated or owned item, and the granular material effect system 50 may have several props 56 that are each movable. The user 58 may select one of the props 56 (e.g., via the user interface 98), and the controller 92 may instruct the selected prop 56 to move to deliver the selected prop 56 toward the user interface 98 and to the user 58. In a further embodiment, the users 58 may directly control movement of the prop 56. By way of example, the user 58 may utilize the user interface 98 to move the prop 56 to designated locations within the container 52.

Figure 4:
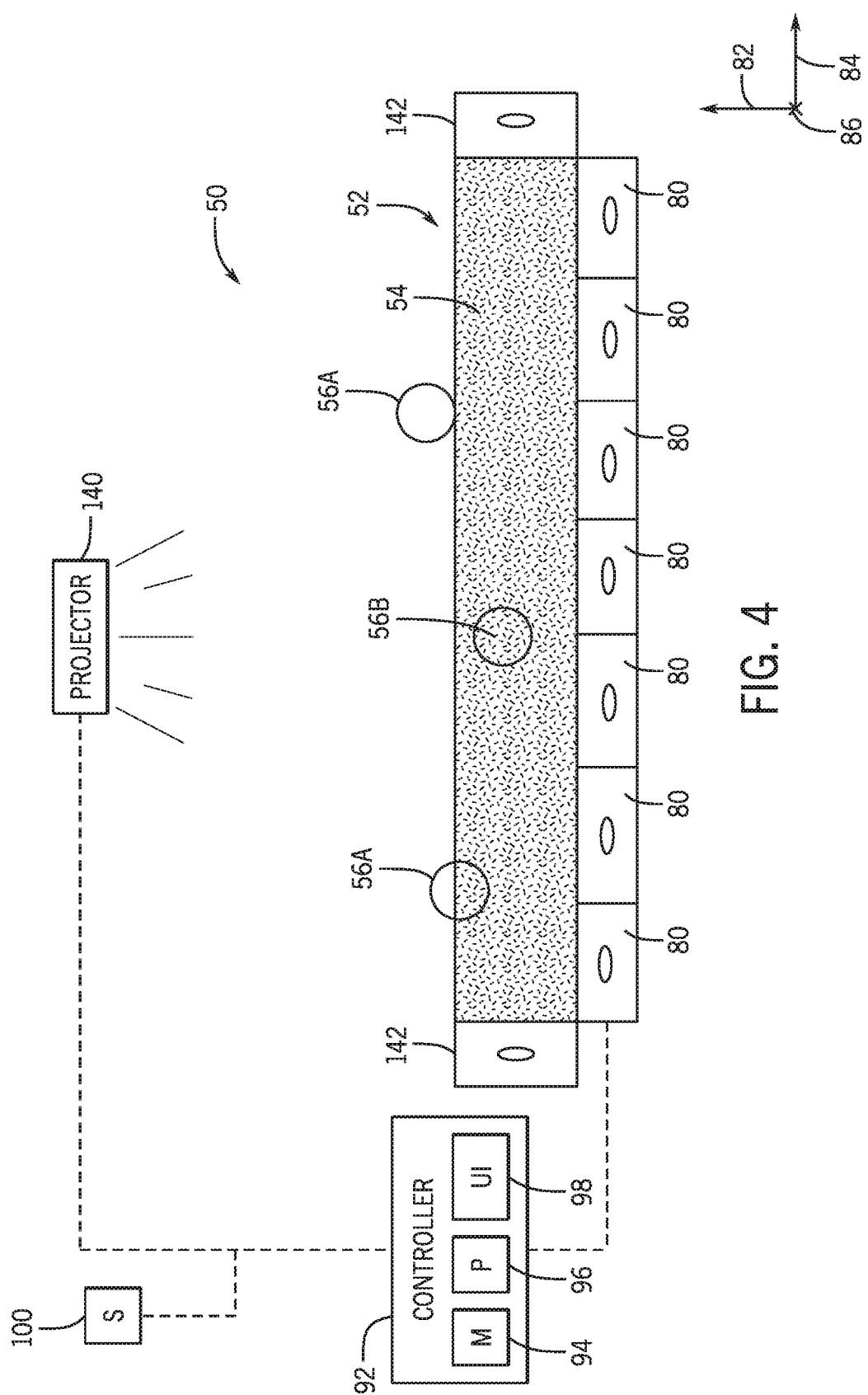
FIG. 4 is a schematic side view of an embodiment of the granular material effect system in conjunction with a projector configured to project an image onto the granular particles, in accordance with an aspect of the present disclosure.

FIG. 4 is a schematic side view of an embodiment of the granular material effect system 50 having the nozzles 80 configured to inject fluid through the granular particles 54 and having a projector 140 configured to project an image onto the granular particles 54. The projector 140 may be communicatively coupled to the controller 92, and the controller 92 may instruct the projector 140 to project a particular image onto the granular particles 54. In one embodiment, the projector 140 may project the image onto the granular particles 54 based on an activation of the nozzles 80. For instance, the nozzles 80 may be activated to produce a wave-like movement of the granular particles 54, and the controller 92 may project an image of a tidal wave onto the granular particles 54. The activation of the nozzles 80 may also form different profiles of the granular particles 54 (e.g., elevate different sections of the granular particles 54 to different heights relative to the vertical axis 82), and the controller 92 may instruct the projector 140 to project the image based on the profile of the granular particles 54. To this end, the sensor 100 may be a position sensor configured to transmit feedback to the controller 92 indicative of the profile of the granular particles 54. Additionally or alternatively, the controller 92 may instruct the projector 140 to project an image based on a time of operation of the granular material effect system 50. For example, the controller 92 may instruct the projector 140 to project a series of images to produce a video displayed on the granular particles 54. The image projected by the projector 140 may also be displayed onto the prop(s) 56. As an example, the prop(s) 56 may appear to change a contour of the granular particles 54, and projecting the image onto the prop(s) 56 may cause the image to appear three dimensional and more life-like. In one embodiment, the controller 92 may instruct the projector 140 to project a particular image based on a determined position of the prop(s) 56 (e.g., as determined by the sensor 100), such as for contour mapping.

In FIG. 4, the depicted prop or props 56 do not include the prop actuator 120 that moves each prop 56. Instead, the prop(s) 56 may be moved by interaction with the granular particles 54 and/or the fluid ejected by the nozzles 80. For example, the granular material effect system 50 may include lateral nozzles 142 that may each direct fluid through the container 52 in a crosswise direction. The lateral nozzles 142 may be operated at different power levels to direct the fluid and move the prop(s) 56 across the container 52 along the longitudinal axis 84 and/or the lateral axis 86. It should be noted that a position of each prop 56 may be substantially maintained when the granular particles 54 are not fluidized. That is, when the nozzles 80, 142 are not directing the fluid through the container 52, the granular particles 54 may stack atop one another. While the granular particles 54 are stacked atop one another, it may be difficult to move the prop(s) 56 through the granular particles 54. In this manner, the controller 92 may instruct the nozzles 80, 142 to activate and inject fluid through the granular particles 54 and also to move the prop(s) 56 to a respective target position in the container 52. Upon determination that the prop(s) 56 are in the respective target position (e.g., based on feedback from the sensor 100), the controller 92 may suspend operation of the nozzles 80, 142 such that the granular particles 54 are no longer fluidized. The granular particles 54 may then stack atop one another to hold the prop(s) 56 in the respective target positions.

For example, in FIG. 4, a first prop 56A may be moved to and fixed in a position that is partially submerged in the granular particles 54, a second prop 56B may be moved to and fixed in a position that is completely submerged in the granular particles 54, and a third prop 56C may be moved above the granular particles 54 along an axis parallel to the vertical axis 82 to a position that is not submerged at all within the granular particles 54. In this illustrated embodiment, it may be difficult to move the first prop 56A and the second prop 56B through the granular particles 54 while the granular particles 54 are not fluidized, because each of the first prop 56A and the second prop 56B are at least partially submerged in the granular particles 54. However, the third prop 56C may be moved more easily (e.g., by the user 58) because the third prop 56C is not partially submerged in the granular particles 54. In an additional or alternative implementation, the controller 92 may be communicatively coupled to any of the props 56, and the props 56 may be configured to emit fluid so as to fluidize the granular particles 54. For example, the controller 92 may controllably effectuate the props 56 to emit the fluid, thereby moving the granular particles 54 within the container 52. Movement of the granular particles 54 may also move the props 56. As such, the controller 92 may use any combination of the nozzles 80, 142 and the props 56 to inject fluid into the container 52.

Figure 5:
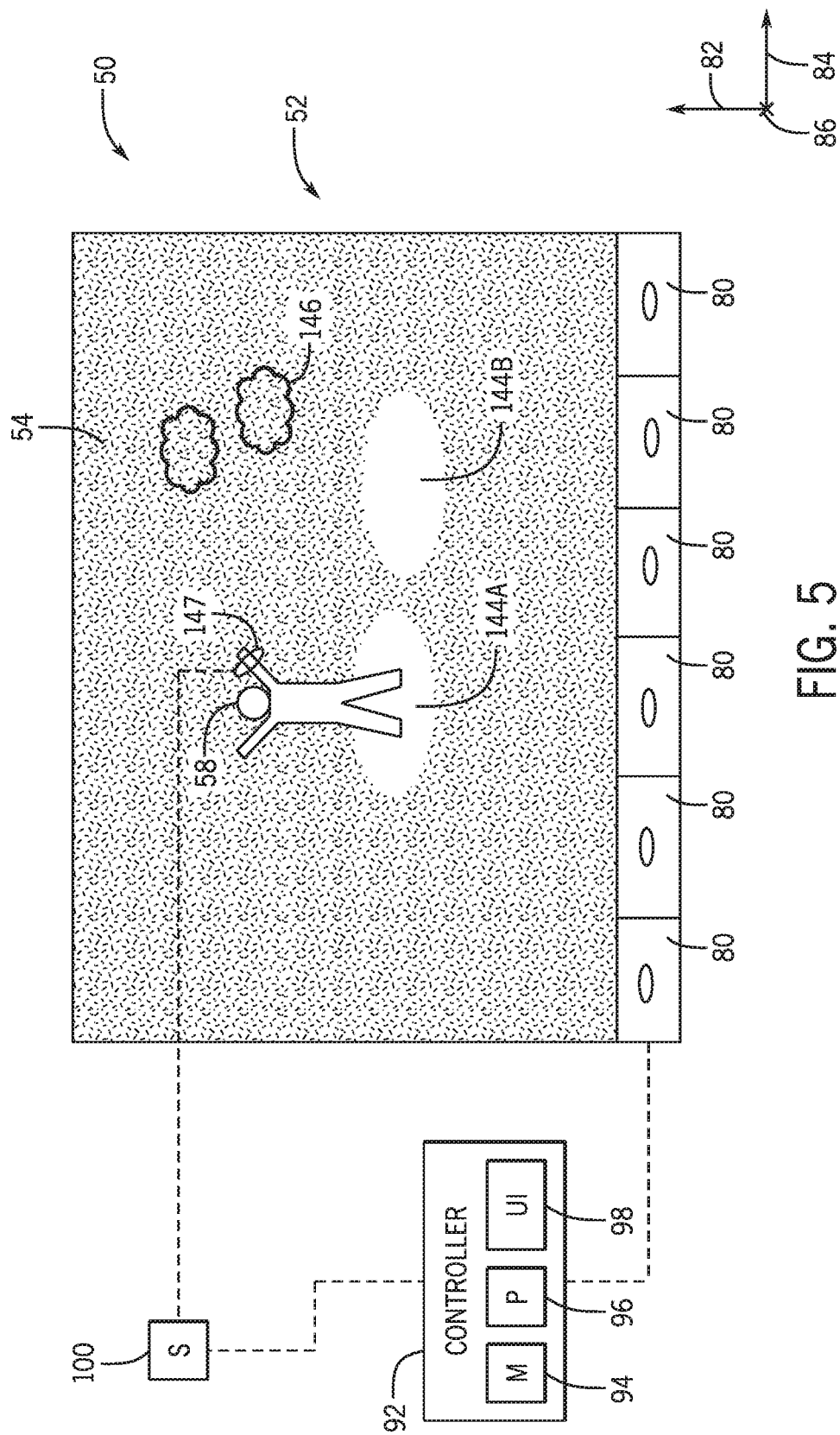
FIG. 5 is a schematic perspective view of an embodiment of the granular material effect system in which individual nozzles are configured to be activated based on a position of a user within the container, in accordance with an aspect of the present disclosure.

FIG. 5 is a schematic perspective view of an embodiment of the granular material effect system 50 having the nozzles 80 that are configured to be activated based on a position of the user 58 within the container 52. In the illustrated embodiment, the controller 92 may suspend operation of nozzles 80 that are located adjacent to the user 58 and may enable operation of a remainder of the nozzles 80. As such, the granular particles 54 adjacent to the user 58 may not be fluidized, but a remainder of the granular particles 54 may be fluidized. As the user 58 changes position within the container 52, the controller 92 may dynamically adjust the operation of the nozzles 80 to inject fluid through different sections of the granular particles 54, such that the granular particles 54 adjacent to the user 58 are not fluidized. Although FIG. 5 illustrates that the injection of the granular particles 54 is based off the position of the user 58, it should be noted that the activation of the nozzles 80 to inject fluid through the granular particles 54 may be based on the position of any other component, such as the prop 56, within the container 52.

In one embodiment, the sensor 100 may be a position sensor and/or a motion sensor to determine the position of the user 58. For example, the sensor 100 may be a light detection and ranging (LIDAR) sensor, a camera, a radio-frequency identification (RFID) sensor, an electro-optical sensor, an ultrasonic sensor, an infrared sensor, another suitable sensor, or any combination thereof. In an embodiment, the sensor 100 may acquire an image of the container 52 and determine the position of the user 58 based on the acquired image of the container 52. In an additional or an alternative embodiment, the sensor 100 may be a pressure sensor to determine the position of the user 58. In other words, the sensor 100 may determine a presence of a force (e.g., a weight) exerted by the user 58 onto the container 52. The location of the user 58 may then be determined based on the location of the determined force.

Based on position information associated with the user 58, the controller 92 may trigger certain granular material effects via selective activation of one or more nozzles 80, thereby causing movement of the granular particles 54 within the container 52. For example, the controller 92 may cause selective activation of nozzles 80 to move the granular particles 54 away from the user 58 to cause a clearing or depression 144 positioned around the user 58. The clearing 144 may move with the user 58 using updated position information of the user 58, to create a parting effect and/or a puff or small explosion effect 146 caused by an intense (high fluid flowrate) and short duration activation of nozzles 80 at certain locations, for example. Other effects as provided herein (e.g., prop actuation, texture effects, color effects) that are based on user position and/or movement are also contemplated. In addition, the granular material effect system 50 may base additional or alternative effects on user position and/or identity. In an embodiment, the user 58 may carry a user-associated device 147, depicted here as a bracelet, that is linked to a user profile accessible by the granular material effect system 50. In an embodiment, verification of certain user profile or identification information may cause the granular material effect system 50 to initiate certain effects as provided herein, which may be further controlled based on the received position information. In one example, user-specific effects, such as writing a username or initials in the granular particles 54 using selective nozzle activation, may be based on detection of a wireless signal from the user-associated device 147. The user-associated device 147 may be implemented as a user-worn or carried device, such as a mobile device, necklace, or headgear. The user-associated device 147 may include communication circuitry, such as a transceiver, that is configured to communicate with the sensor 100 and/or the controller 92.

Figure 6:
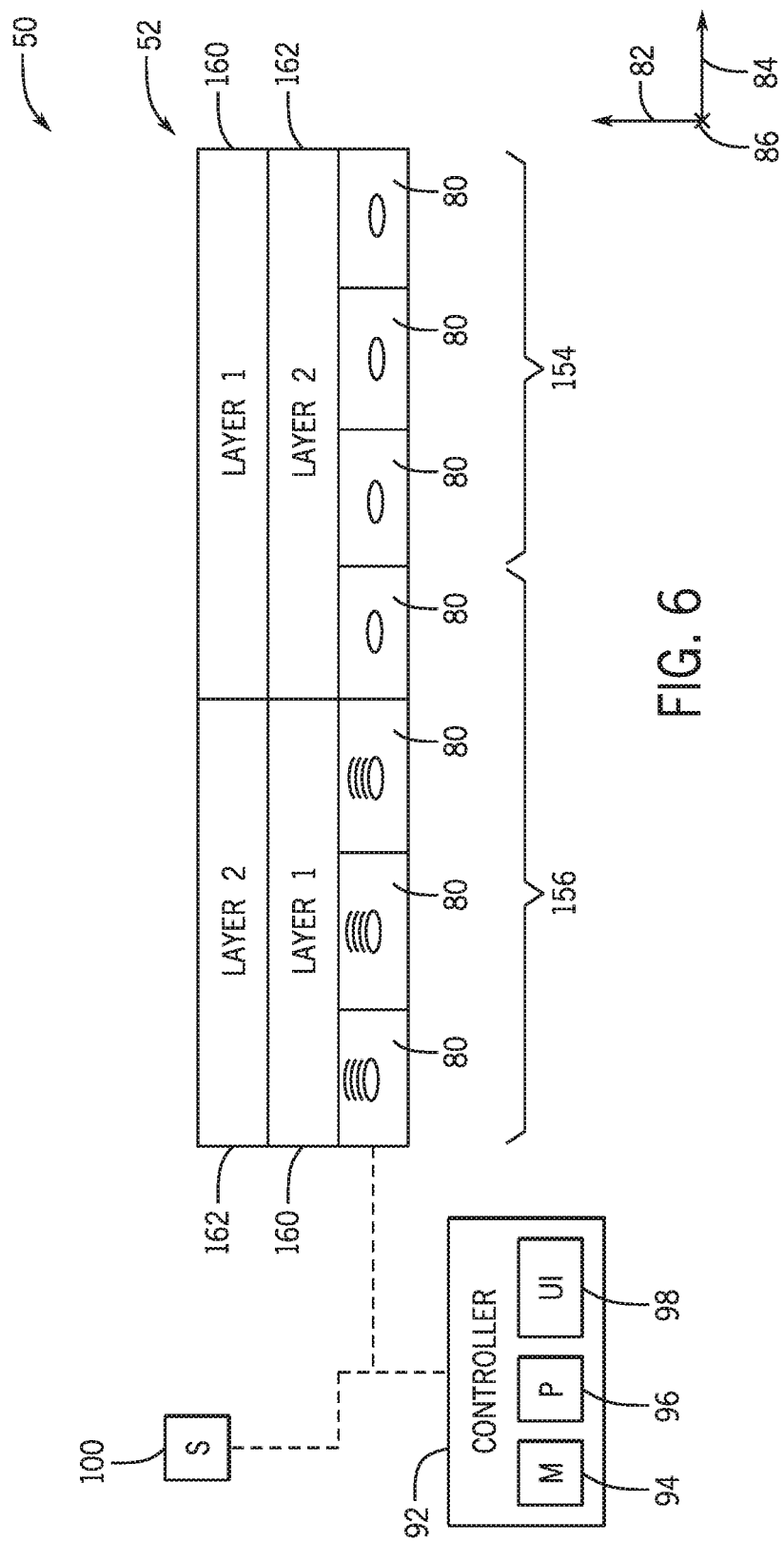
FIG. 6 is a schematic side view of an embodiment of the granular material effect system in which fluid is injected to change a layering of the granular particles, in accordance with an aspect of the present disclosure.

FIG. 6 is a schematic side view of an embodiment of the granular material effect system 50 having the nozzles 80 configured to activate to change a layering of the granular particles 54. For instance, the granular material effect system 50 may include a first layer 160 of a first type (e.g., a first color) of granular particles 54, and a second layer 162 of a second type (e.g., a second color) of granular particles 54 that is different than the first type of granular particles 54. The controller 92 may receive feedback (e.g., from the sensor 100) indicative of a target orientation of the first layer 160 of the granular particles 54 relative to the second layer 162 of the granular particles 54. In response, the controller 92 may instruct the nozzles 80 to activate and change how the first layer 160 of granular particles 54 and the second layer 162 of granular particles 54 are arranged (e.g., along an axis parallel to the vertical axis 82). For instance, a first set 154 of nozzles 80 at a first section of the container 52 may not be activated, and the first layer 160 of granular particles 54 at the first section may be positioned on top of the second layer 162 of granular particles 54 at the first section. However, a second set 156 of nozzles 80 at a second section of the container 52 may be activated, and the second layer 162 at the second section of granular particles 54 are positioned on top of the first layer 160 of granular particles 54 at the second section. In one embodiment, the granular particles 54 of the second layer 162 of granular particles 54 may be less dense or buoyant than the granular particles 54 of the first layer 160 of granular particles 54. As such, the second layer 162 of granular particles 54 may be displaced a greater distance upon activation of the nozzles 80. In this manner, activation of the nozzles may move the first layer 160 of granular particles 54 above the second layer 162 of granular particles 54 to rearrange the position of the first layer 160 relative to the second layer 162. Although FIG. 6 illustrates activating the nozzles 80 to rearrange the granular particles 54 parallel to the axis 82, activation of the nozzles 80 may additionally or alternatively change how the first layer 160 of granular particles 54 and the second layer 162 of granular particles 54 may be oriented relative to one another parallel to the longitudinal axis 84 and/or the lateral axis 86.

In an example, the granular material effect system 50 may be used as a stage for a performance. During a first scene of the performance, the first layer 160 may be positioned above the second layer 162. The first layer 160 may be visible to the audience and may present a particular setting for the performance, while the second layer 162 is not visible to the audience. At the second scene of the performance, the controller 92 may receive feedback indicative that the second layer 162 is to be positioned above the first layer 160 and, in response, the controller 92 may instruct the nozzles 80 to activate to move the second layer 162 above the first layer 160. As such, the first layer 160 is visible to the audience in the second scene, whereas the second layer 162 is not visible to the audience. The second layer 162 may then present a different setting for the performance. In this manner, the granular material effect system 50 may enable the setting of the performance to be changed out by merely activating the nozzles 80, and without having to change part of the stage manually. Thus, a cost or a time associated with changing part of the stage may be reduced with the implementation of the granular material effect system 50.

Figure 7:
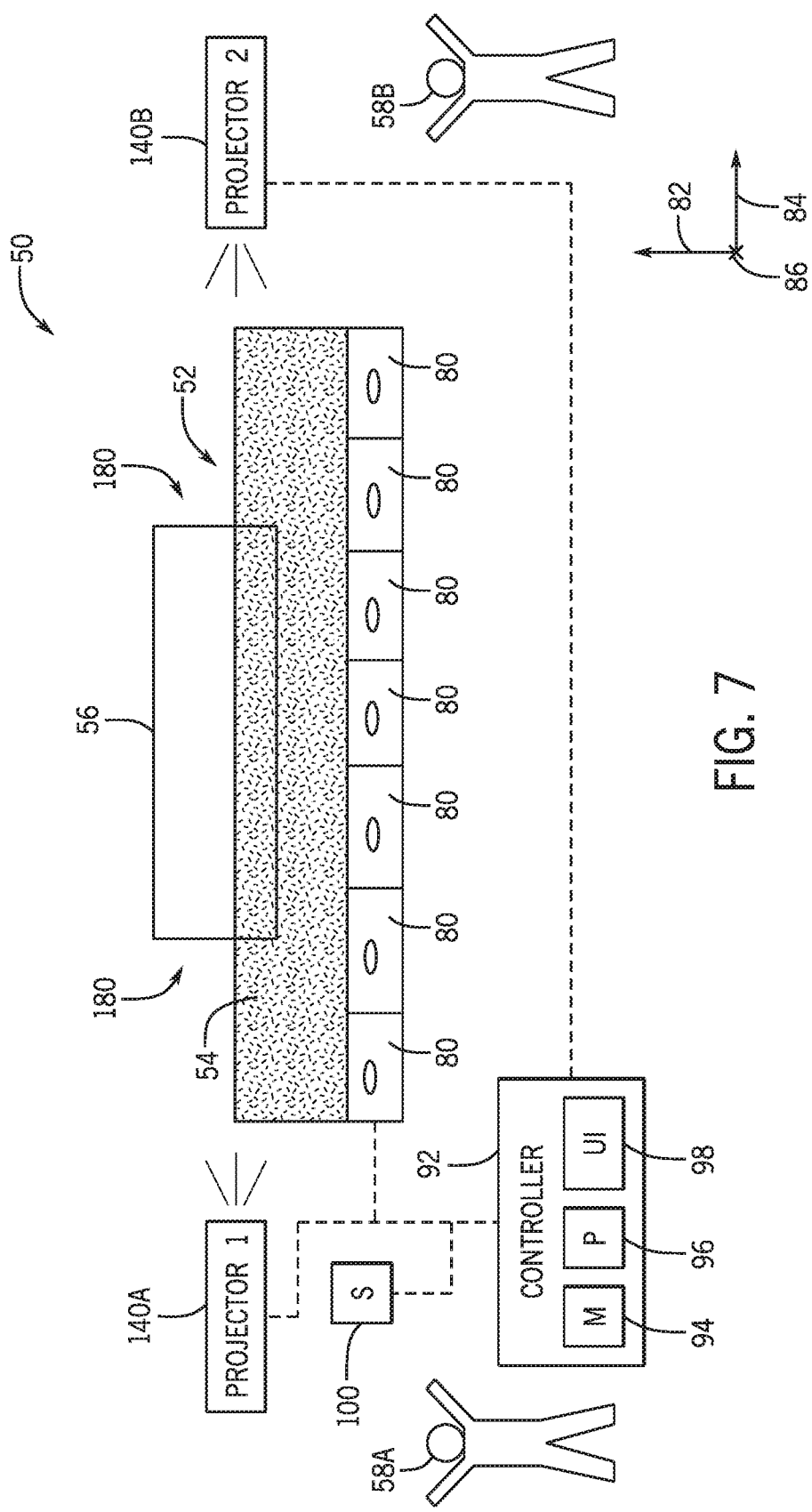
FIG. 7 is a schematic side view of an embodiment of the granular material effect system having different projectors that may each project a different image seen by different users based on position, in accordance with an aspect of the present disclosure.

FIG. 7 is a schematic side view of an embodiment of the granular material effect system 50 having different projectors 140 that may each project a different image seen by the users 58. In the illustrated embodiment, the granular material effect system 50 includes a first projector 140A and a second projector 140B, but it should be noted that the granular material effect system 50 may include any suitable number of projectors 140 in alternative embodiments. The granular material effect system 50 may also have one or more props 56 that may be disposed within the granular particles 54, and the prop(s) 56 may have reflective properties that enable the prop(s) 56 to be used as a screen or a surface onto which images may be projected. The first projector 140A is configured to project a first image onto the prop(s) 56, such as onto a first side 180 of the prop(s) 56, and the second projector 140B is configured to project a second image onto the prop(s) 56, such as onto a second side 182 of the prop(s) 56. Different users 58 may view a different image projected onto the prop(s) 56 based on a position of the user 58 relative to the prop(s) 56. As illustrated, a first user 58A, who is positioned adjacent to the first side 180 of the prop(s) 56, may view the first image projected onto the prop(s) 56 by the first projector 140A. However, a second user 58B, who is positioned adjacent to the second side 182 of the prop(s) 56, may view the second image projected onto the prop(s) 56 by the second projector 140B.

In an additional or an alternative embodiment, the projectors 140 may project the respective images directly onto the granular particles 54. By way of example, the granular particles 54 may have reflective or retroreflective properties (e.g., microscale glass beads) and may be positioned in a manner to enable the granular particles 54 to be used as a screen or surface onto which the images may be projected. In one embodiment, the granular particles 54 may be continuously poured into the container 52 from an elevated height to form a vertical column, or a waterfall like movement, that enables the images to be projected onto the granular particles 54. Using a similar technique described above, the first projector 140A may project a first image onto the granular particles 54 (e.g., toward one of the sides of the granular particles 54) and the second projector 140B may project a second image onto the granular particles 54 (e.g., toward a different side of the granular particles 54). Thus, the users 58 may view different images projected onto the granular particles 54 based on the location of the users 58 relative to the granular particles 54. Additionally or alternatively, granular particles 54 at different sections within the container 52 may be disposed at different heights parallel to the axis 82 to enable different images to be projected onto various sides of the granular particles 54 at the different sections. In a further embodiment, the granular particles 54 may be moved while falling into the container 52. As an example, fluid, vibrations (e.g., ultrasonic waves), and/or other suitable perturbation techniques may be implemented to create varying degrees of controlled movement of the granular particles 54 as the granular particles 54 fall into the container 52. For instance, such perturbation techniques may cause the falling granular particles 54 to create wave-like movement, and the projectors 140 may project water-like images onto the granular particles 54 to create a realistic cascade special effect.

In one example implementation, the first projector 140A may project tree-like features onto the prop(s) 56 and water-like features onto the granular particles 54. Thus, the first projector 140A immerses the granular material effect system 50 in a first setting, which may be a forest. The second projector 140B may project shrub-like features onto the prop(s) 56 and ice-like features onto the granular particles 54 to immerse the granular material effect system 50 in a second setting, which may be a tundra. Thus, based on the location of the user 58 relative to the prop 56, the user 58 may see or be surrounded by a particular setting.

Figure 8:
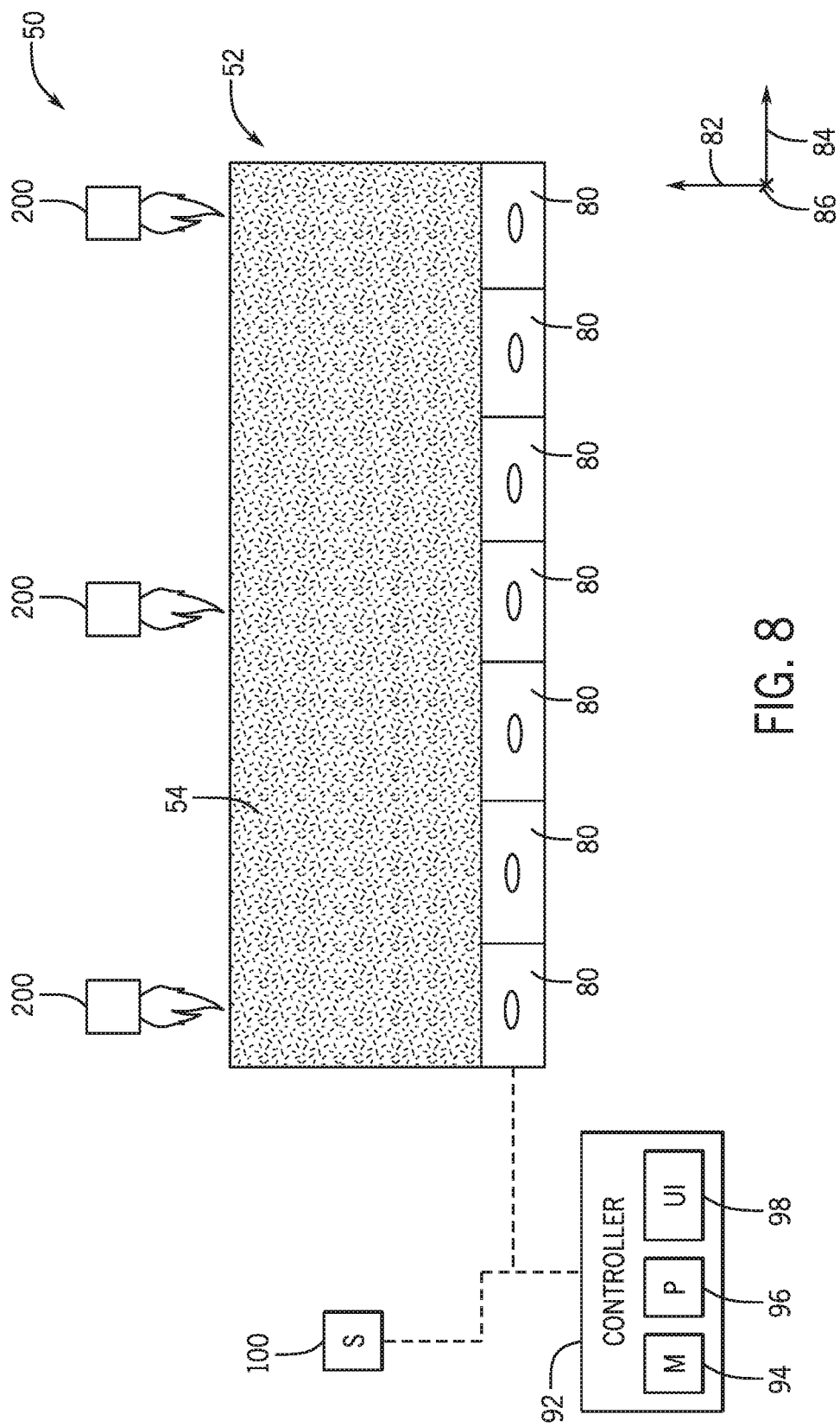
FIG. 8 is a schematic side view of an embodiment of the granular material effect system having multiple ignition sources that are each configured to create a flame, in accordance with an aspect of the present disclosure.

FIG. 8 is a schematic side view of an embodiment of the granular material effect system 50 having multiple ignition sources 200 that are each configured to create a flame. For example, the nozzles 80 may direct a fluid mixture, which contains a flammable fluid (e.g., natural gas), through the container 52 to inject fluid through the granular particles 54. Each of the ignition sources 200 may create a flame when the flammable fluid is directed near the ignition source 200 and may create a visual effect that the granular particles 54 adjacent to the ignition source 200 is on fire. The fluid mixture may have a particular composition of flammable fluid and non-flammable fluid to create a particularly sized flame. By way of example, fluid mixture having a greater ratio of flammable fluid to non-flammable fluid may result in a larger flame than a fluid mixture having a smaller ratio of flammable fluid to non-flammable fluid. In one implementation, different nozzles 80 may direct fluid mixtures having different compositions of flammable fluid and non-flammable fluid, such that differently-sized flames may be produced at different areas of the container 52.

As shown in FIG. 8, each ignition source 200 is positioned directly above the nozzles 80 along the vertical axis 82, but additionally or alternatively, the ignition sources 200 may be positioned at the sides of the container 52 parallel to the longitudinal axis 84 and/or the lateral axis 86. Moreover, each ignition source 200 may be controlled independently of one another, such that the flames are local to the area surrounding the particular ignition source 200. For example, the controller 92 may activate certain ignition sources 200 at one section of the container 52 to enable flames to be created at that section, but the controller 92 may not activate certain ignition sources 200 at another section of the container 52, such that flames are not created at the other section.

Figure 9:
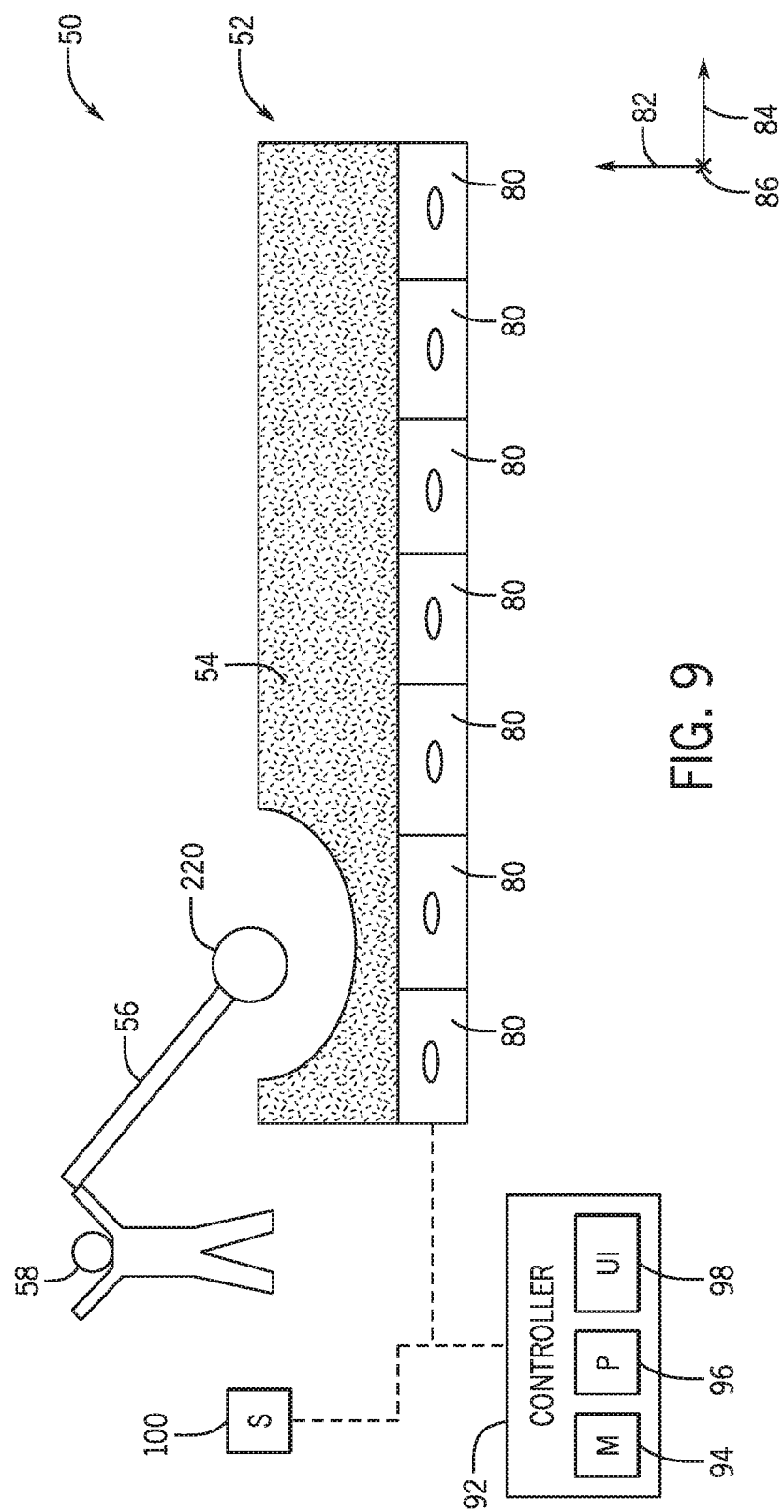
FIG. 9 is a schematic side view of an embodiment of the granular material effect system having a particular prop that is configured to move granular particles surrounding the prop, in accordance with an aspect of the present disclosure.

FIG. 9 is a schematic side view of an embodiment of the granular material effect system 50 having a fluid injection prop 56 that is configured to move granular particles 54 surrounding the prop 56. The prop 56 may emit the fluid, which may drive granular particles 54 away from the prop 56. In one embodiment, the prop 56 may inject fluid through the granular particles 54 instead of the nozzles 80. That is, operation of the nozzles 80 may be suspended, such that the granular particles 54 are not fluidized, and are stacked atop one another. However, the prop 56 may inject fluid through the granular particles 54 upon positioning the prop 56 adjacent to the granular particles 54. In this manner, the granular material effect system 50 may create the effect that the prop 56 is remotely moving the granular particles 54 (i.e., without contacting the granular particles 54).

In one embodiment, the prop 56 may be user-controlled. For example, one of the users 58 may hold the prop 56, which may have a component 220 configured to emit the fluid and inject fluid through the granular particles 54. The user 58 may control when the component 220 emits the fluid and may position the component 220 as desired within the container 52. Thus, the user 58 may generally control fluidization of the granular particles 54 via the prop 56. In an additional or an alternative embodiment, the controller may automatically control the prop 56, including automatically activating emission of the fluid by the component 220 and/or adjustment of the position of the prop 56.

FIG. 10 is a schematic side view of an embodiment of the granular material effect system 50 that is configured to inject fluid through the granular particles 54 to facilitate removal of debris 240 that may be disposed within the granular particles 54. The debris 240 may include trash, dirt, or any other unwanted items that may be dropped into the container 52. As mentioned, aeration or fluidization of the granular particles 54 may enable objects to move more easily through the granular particles 54. Thus, while the granular particles 54 are injected with a suitable fluid, such as air, a sheet 242 may be moved through the granular particles 54 to capture the debris 240, and to remove the captured debris 240 out of the container 52. The sheet 242 may be a net or a mesh having openings that are sized to enable the granular particles 54 to sift and filter through the sheet 242. Thus, the sheet avoids capturing the granular particles 54. However, the openings may also be sized to enable the debris 240 to be captured by the sheet 242, rather than filtered through the sheet 242. Thus, after the sheet 242 is moved through the container 52, the debris 240 may be removed from the container 52, but the granular particles 54 may remain within the container 52.

The controller 92 may be configured to move the sheet 242. For example, the controller 92 may be communicatively coupled to a sheet actuator 244 that may move the sheet 242 through the container 52. In one embodiment, the controller 92 may instruct the actuator 244 to move the sheet 242 through a particular section of the container 52. For example, the granular particles 54 may not typically be fluidized during operation of the granular material effect system 50, and debris 240 may collect within the container 52 over time. A first section 246 of the container 52 may have a high amount of debris 240 (e.g., as determined by the sensor 100) and a second section 248 of the container 52 may have a low amount of debris 240. Thus, the controller 92 may operate the granular material effect system 50 to remove the debris from the first section 246 of the container 52. To this end, the controller 92 may activate a first set 250 of nozzles 80 to inject fluid into the first section 246 of the container 52. Meanwhile, the controller 92 may not activate a second set 252 of nozzles 80, and the granular particles 54 of the second section 248 are not fluidized and may remain stacked atop one another. The controller 92 may then instruct the actuator 244 to move the sheet 242 through the first section 246 of the container 52, but not the second section 248 of the container 52. As a result, the debris 240 disposed in the first section 246 may be removed from the container 52, but the debris 240 disposed in the second section 248 may remain in the container 52.

FIG. 11 is a flowchart of a method or process 270 that may be employed by the granular material effect system 50 of FIG. 10 to remove debris within the container 52. For example, a controller, such as the controller 92, may be configured to execute the method 270. It should be noted that the steps of the method 270 may be performed differently in other embodiments, such as for different configurations of the granular material effect system 50. As an example, additional steps may be performed, or certain steps depicted in FIG. 11 may be removed, modified, or performed in a different order.

At block 272, a presence of debris 240 in the container 52 may be determined. In one embodiment, the presence of debris 240 may include a determined amount of debris that is above a threshold amount, and the amount may include a discrete quantity, a weight, a surface area, a volume, or any combination thereof, associated with the debris 240. Additionally, the presence of debris 240 may be associated with a particular area within the container 52. In other words, it may be determined where the debris 240 is located, and if the amount of debris in that area is above a threshold concentration (e.g., a quantity per area of the container).

At block 274, in response to determining the presence of debris 240 in the container, the granular particles 54 may be fluidized, such as via the nozzles 80. In one embodiment, granular particles 54 at a certain area within the container 52 may be fluidized, such as an area having a high concentration of debris 240. Granular particles 54 at a remainder of the container (e.g., having a low concentration of debris 240) may not be fluidized, thereby reducing or limiting an energy consumption associated with fluidizing the container 52.

At block 276, the debris 240 may be removed from the fluidized granular particles 54. For example, the sheet 242 may be moved through the area of the container 52 in which the granular particles 54 are fluidized, and the sheet 242 may capture the debris 240 without capturing the granular particles 54. The sheet 242 may then be moved out of the container 52 to remove the captured debris 240 from the container 52. At block 278, after the debris 240 has been removed from the fluidized granular particles 54, fluidization of the granular particles 54 may be suspended or deactivated. The granular particles 54 may then stack atop one another.

While only certain features of the disclosure have been illustrated and described herein, many modifications and changes will occur to those skilled in the art. It is, therefore, to be noted that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f).

However, for any claims containing elements designated in any other manner, it is intended that such elements are not to be interpreted under 35 U.S.C. 112(f).

The invention claimed is:

1. A granular material effect system, comprising:
a plurality of granular particles disposed in a container;
a nozzle configured to activate to direct a fluid into the container;
an actuator disposed in the container within the plurality of granular particles, wherein the actuator is coupled to a prop; and
a controller communicatively coupled to the nozzle and the actuator, wherein the controller is configured to:
instruct the nozzle to activate to direct the fluid into the container; and
instruct the actuator to move the prop relative to the container while the nozzle is activated.

2. The granular material effect system of claim 1, wherein the nozzle is part of a plurality of nozzles, wherein each nozzle of the plurality of nozzles is configured to direct the fluid into the container from different positions on or near the container, and wherein the controller is configured to instruct each nozzle of the plurality of nozzles to activate independently of one another to direct the fluid.

3. The granular material effect system of claim 1, comprising a sensor configured to detect debris disposed in the container and within the plurality of granular particles, wherein the prop is a sheet configured to capture the debris, and the controller is configured to instruct the actuator to move the sheet through the plurality of granular particles to remove the debris from the container in response to receiving feedback from the sensor, the feedback indicative of detected debris in the container.

4. The granular material effect system of claim 1, comprising a projector configured to project an image toward the container based on a position of the prop.

5. The granular material effect system of claim 4, wherein the projector is a first projector, and the granular material effect system comprises a second projector, wherein the controller is configured to instruct the first projector to project a first image onto a first side of the prop and/or the plurality of granular particles, and/or wherein the controller is configured to instruct the second projector to project a second image onto a second side of the prop and/or the plurality of granular particles.

6. The granular material effect system of claim 1, wherein the controller is configured to receive feedback indicative of a target position of the prop, and the controller is configured to instruct the actuator to move the prop toward the target position based on the feedback.

7. The granular material effect system of claim 1, comprising a sensor configured to determine a position of the actuator with respect to the plurality of granular particles, and the controller is configured to instruct the actuator to move the prop based on a level of the plurality of granular particles, such that the prop remains at least partially submerged within the plurality of granular particles.

8. The granular material effect system of claim 1, wherein the plurality of granular particles comprises a first type of granular particle and a second type of granular particle, wherein an individual granular particle of the first type of granular particle is more dense than an individual granular particle of the second type such that the first type of granular particle forms a first layer within the container and the second type forms a second layer within the container while the nozzle is deactivated.

9. The granular material effect system of claim 8, wherein the first type of granular particle is a different color than the second type of granular particle.

10. A granular material effect system, comprising:
a plurality of granular particles disposed in a container;
a plurality of nozzles disposed about the container, wherein each nozzle of the plurality of nozzles is configured to activate to inject fluid into the container to move at least a portion of the granular particles of the plurality of granular particles;
a prop disposed in the container; and
a controller communicatively coupled to each nozzle of the plurality of nozzles, wherein the controller is configured to:
receive feedback indicative of a target position of the prop and an actual position of the prop; and
instruct a subset of nozzles of the plurality of nozzles to activate in response to receiving the feedback, wherein activation of the plurality of nozzles causes injection of fluid into the container to move the prop from the actual position towards the target position.

11. The granular material effect system of claim 10, wherein an additional subset of nozzles of the plurality of nozzles is not activated by the controller while the subset of nozzles is activated.

12. The granular material effect system of claim 10, wherein the controller is communicatively coupled to an individual nozzle of the plurality of nozzles, the individual nozzle being positioned within the prop, and wherein the controller is configured to control the individual nozzle to emit fluid.

13. The granular material effect system of claim 10, wherein at least one nozzle of the plurality of nozzles is configured to inject a flammable fluid into the container, and wherein the granular material effect system comprises an ignition source configured to ignite the flammable fluid.

14. The granular material effect system of claim 10, wherein the controller is configured to control a flowrate of fluid injection from each nozzle of the plurality of nozzles.

15. A granular material effect system, comprising:
a plurality of granular particles disposed in a container;
a plurality of nozzles, wherein each nozzle of the plurality of nozzles is configured to inject fluid into the container;
one or more position sensors; and
a controller communicatively coupled to each nozzle of the plurality of nozzles, wherein the controller is configured to:
receive feedback from the one or more position sensors indicative of a position of a user in or near the container; and
instruct at least one nozzle of the plurality of nozzles to inject fluid into the container based on the feedback to fluidize the granular particles.

16. The granular material effect system of claim 15, wherein the one or more position sensors comprise a light detection and ranging sensor, a camera, an RFID sensor, an electro-optical sensor, an ultrasonic sensor, an infrared sensor, or any combination thereof.

17. The granular material effect system of claim 15, wherein the controller is configured to instruct a subset of nozzles of the plurality of nozzles to inject fluid into the container, wherein the subset of nozzles of the plurality of nozzles is located close to the position of the user as determined based on the received feedback.

18. The granular material effect system of claim 17, wherein the controller is configured to instruct the subset of nozzles of the plurality of nozzles to move the plurality of granular particles to create a clearing or depression at the position of the user.

19. The granular material effect system of claim 15, comprising a user-associated device configured to provide user identification information of the user, wherein the controller is configured to instruct the at least one nozzle based at least in part on the user identification information.

20. The granular material effect system of claim 15, comprising a prop disposed in the container and submerged under at least a portion of the granular particles of the plurality of granular particles, wherein the controller is configured to instruct an actuator to cause the prop to emerge from the plurality of granular particles while the at least one nozzle is injecting fluid unto the container.

\* \* \* \* \*